L. B. WILLIAMS.
FRUIT SIZE GRADER.
APPLICATION FILED OCT. 27, 1913.
1,109,099.
Patented Sept. 1, 1914.
3 SHEETS—SHEET 1.
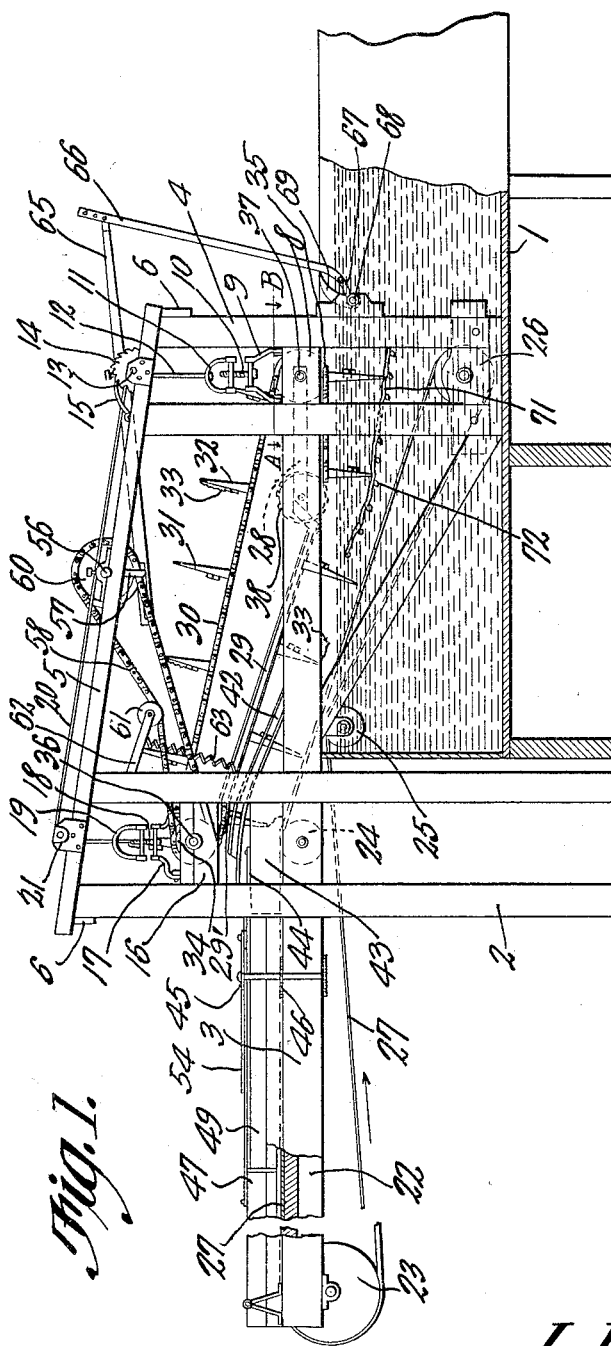
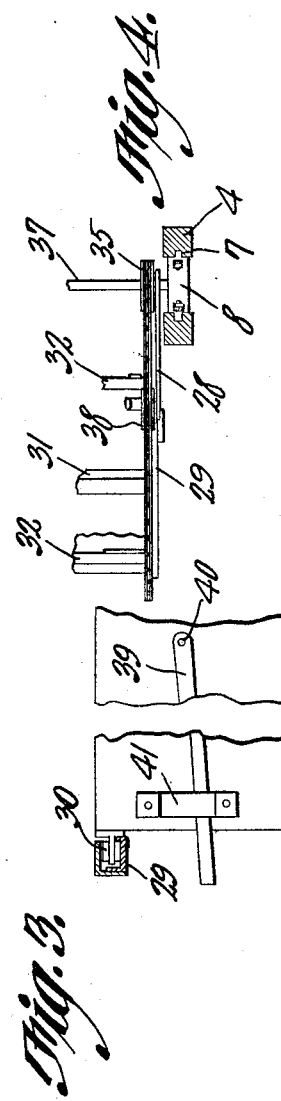
Witnesses
L. B. Williams Inventor
by C. A. Snow & Co.
Attorneys L. B. WILLIAMS.
FRUIT SIZE GRADER.
APPLICATION FILED OCT. 27, 1913.
1,109,099.
Patented Sept. 1, 1914
3 SHEETS—SHEET 2.
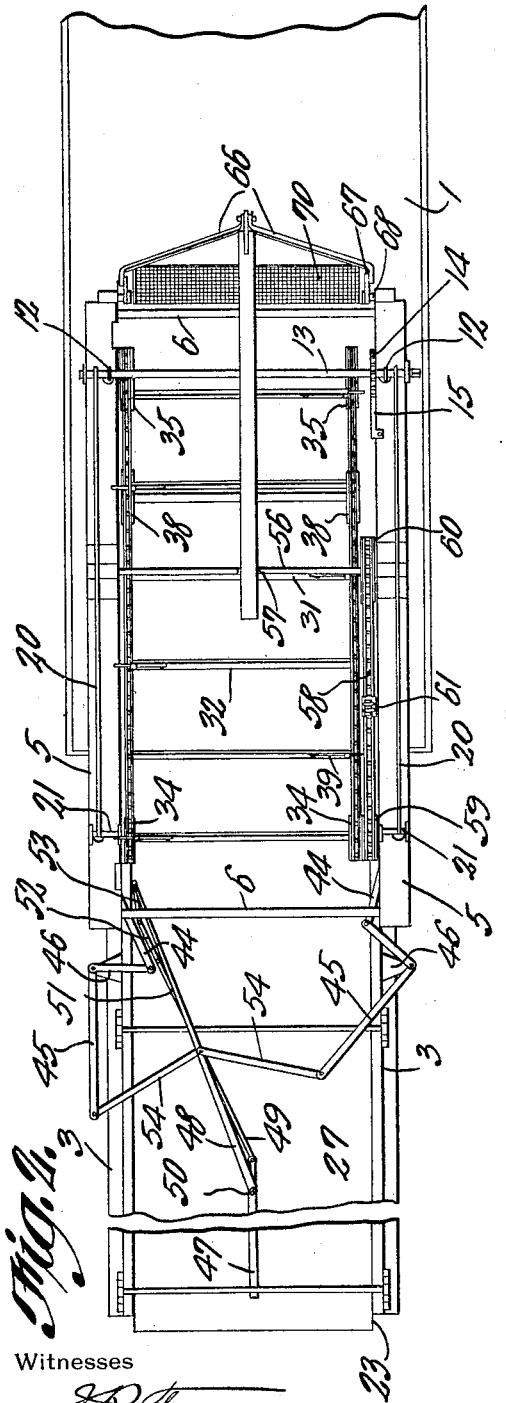
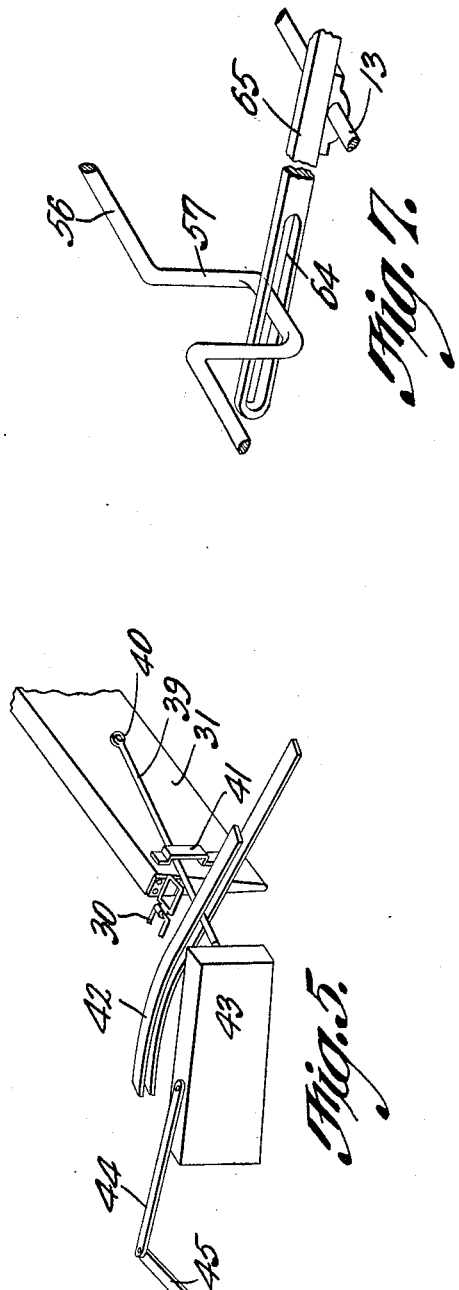
Witnesses
L. B. Williams, Inventor
by C. A. Snow & Co., Attorneys

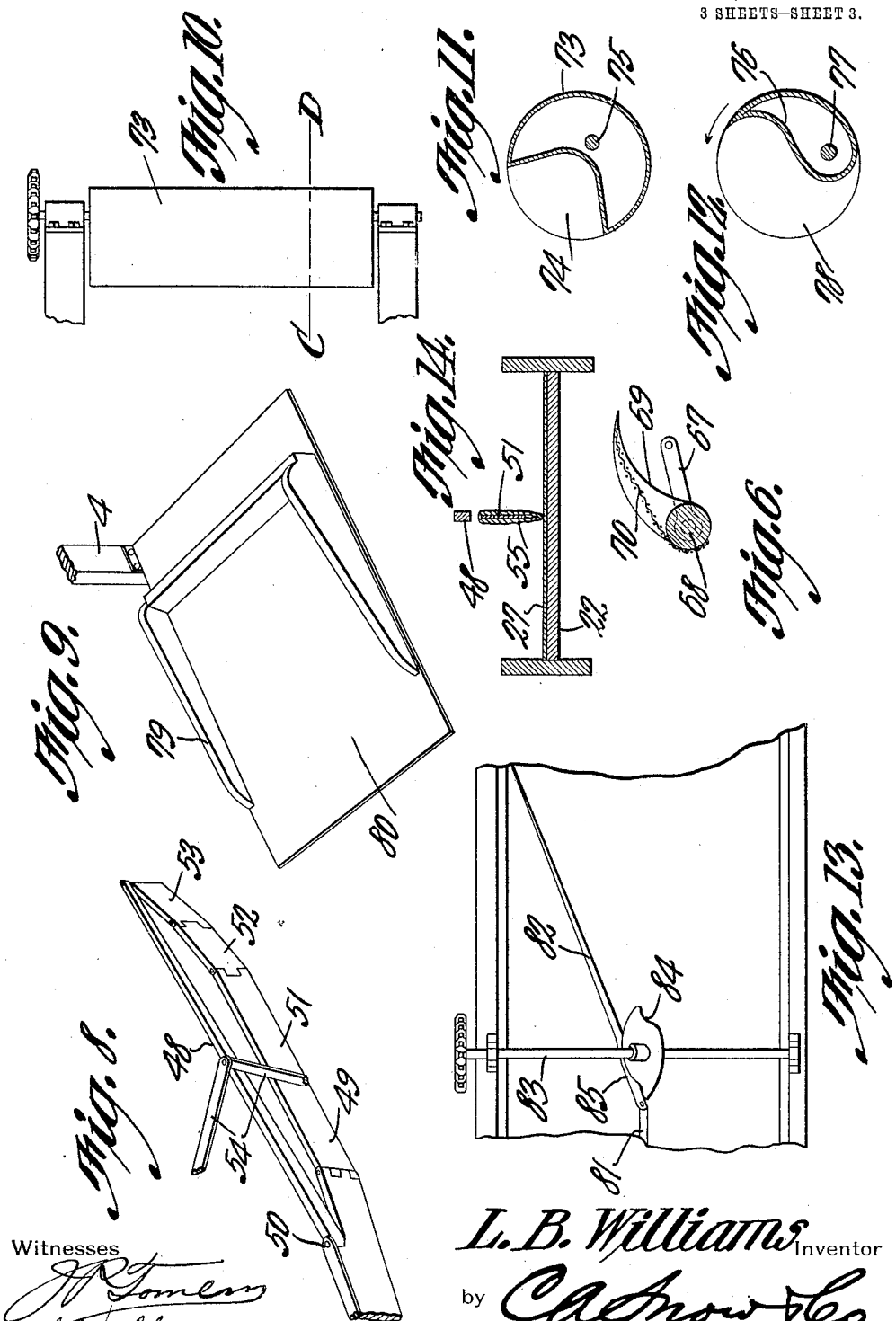

UNITED STATES PATENT OFFICE.

LEE BARNETT WILLIAMS, OF HUMANSVILLE, MISSOURI.

FRUIT SIZE-GRADER.

1,109,099.    Specification of Letters Patent.    Patented Sept. 1, 1914.

Application filed October 27, 1913. Serial No. 797,665.

*To all whom it may concern:*

Be it known that I, LEE BARNETT WILLIAMS, a citizen of the United States, residing at Humansville, in the county of Polk and State of Missouri, have invented a new and useful Fruit Size-Grader, of which the following is a specification.

This invention relates to machines for size grading fruit, the same being more particularly adapted for size grading lemons at the time of washing.

It is well known to those acquainted with the lemon industry that the fruit is washed as soon as possible after picking and is then placed in boxes for storage after which they are removed from the boxes, graded as to quality, etc., and packed according to size, thus to meet the demands of the trade. This system of handling the fruit (storing all sizes together) is objectionable for the reason that it requires an objectionable amount of handling and consequent danger of injury to the fruit and necessitates the prompt shipment of the fruit because it has been set back, it being a well known fact that fruit immediately "goes off" or deteriorates in appearance and keeping quality after being handled.

The demands of the trade require usually that the fruit be sold in two grades or sizes, to wit, those averaging three hundred and sixty or less to the box, and three hundred and sixty or more to the box.

One of the objects of the present invention is to provide a machine for sizing lemons and the like at the time of washing so that all fruit of the larger grade will be separated from the smaller grade, the sizing mechanism being also utilized for the purpose of removing the fruit from the washing tank and directing it to the employees employed for filling boxes.

A further object is to provide sizing mechanism which will operate efficiently to separate the fruit into two grades, means being provided for automatically supplying the fruit to the sizing mechanism and for permitting handling of the fruit while being sized without bruising or otherwise injuring it.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings:—Figure 1 is a side elevation of the sizing machine, the washing tank being shown partly in section. Fig. 2 is a plan view of the machine. Fig. 3 is an enlarged elevation of one end portion of one of the blades of the sizer and showing one of its chain guides in section. Fig. 4 is a section on line A—B Fig. 1. Fig. 5 is a perspective view of one end portion of one of the blades of the sizer and showing its push rod and the parts coöperating therewith. Fig. 6 is a transverse section through the feed member. Fig. 7 is a perspective view of a portion of the operating mechanism of the feed member. Fig. 8 is a perspective view of the deflecting blade and its adjacent mechanism. Fig. 9 is a perspective view of a modified form of buoyant retainer for use in connection with the blades of the sizer. Fig. 10 is a plan view of another form of feed member. Fig. 11 is a section therethrough on line C—D. Fig. 12 is a section through another form of feed member. Fig. 13 is a plan view of a modified form of deflecting means to be used on the table. Fig. 14 is a transverse section through the deflector and adjacent parts.

Referring to the figures by characters of reference 1 designates a washing tank of any desired form and the sizing mechanism constituting the present invention is adapted to extend into this tank and to remove the fruit from it.

Erected adjacent one end of the tank is a frame 2 having substantially horizontal side beams 3 which overhang the tank 1 and also extend any desired distance beyond the end of the tank. Connected to those ends of the beams 3 overhanging the tank 1 are standards 4 arranged in pairs, one pair being connected to each side beam 3 and said standards being extended vertically down to the bottom of the tank or to points close to the bottom. Arranged on the standards 4 and frame 2 are top beams 5 and it is to be understood that these top beams as well as the frames 2 and standards 4 can be connected by any suitable arrangement of cross beams 6. The standards 4 are provided with longitudinal grooves 7 constituting guideways for bearing boxes 8, each box having a yoke 9 connected to its upper face and this yoke being adjustably connected, as by means of a bolt 10, to a stirrup 11 to which an adjusting rope 12 or the like is attached. The ropes from which the two bearing boxes 8 are suspended, are attached to a winding shaft 13 journaled on the top beams 5. This winding shaft has a ratchet wheel 14 normally engaged by a pawl 15 whereby unwinding of the rope 12 can be prevented. Additional bearing boxes 16 can be slidably mounted in the sides of frame 2, these bearing boxes 16 being also provided with yokes 17 thereon, the said yokes being connected by bolts 18 to stirrups 19. These stirrups are connected to ropes 20 or the like extending over guide sheaves 21 and thence to the winding shaft 13. Thus it will be seen that by rotating the shaft 13 in one direction all of the bearing boxes to wit, the two boxes 8 and the two boxes 16 can be raised or lowered. Supported between those portions of the side beams 3 projecting beyond and away from the tank 1, is a table 22, this table being of any desired length and being extended up close to the tank wall.

A roller 23 is mounted across the outer end of the table 22 and a smaller roller 24 is mounted across the inner end of the table. Another roller 25 is journaled below the level of the table and in the upper portion of the tank close to the tank wall, while a fourth roller 26 is journaled between the lower ends of the standards 4 so as to be supported close to the bottom of the tank. Extending over these rollers is an endless apron 27, the upper flight of the apron being extended along the top of table 22 and inclined downwardly from roller 24 to roller 26 while the lower flight of the apron is extended upwardly from roller 26 and over roller 25 to roller 23. This endless apron can be driven in the direction indicated by the arrow by any suitable mechanism provided for that purpose and constitutes both an incline up which the fruit being sized can be carried and a conveyer for conducting the fruit longitudinally of the table 22. The side beams 3 extend upwardly above the horizontal portion of the upper flight of the apron so as to constitute side guards whereby fruit is retained on the apron. This will be apparent by referring particularly to Fig. 14.

Extending horizontally from the bearing boxes 8 are side arms 28 and these arms are connected to the boxes 16 by inclined channeled guides 29 extended parallel with the inclined portion of the upper flight of apron 27. Each of these channeled guides is preferably made up of two oppositely disposed lapping angle strips, as shown in Fig. 3 and the said guides are adapted to receive the side chains 30 of an endless belt. The upper ends of the guides 29 are dipped downwardly as at 29' toward apron 27, for the purpose hereinafter set forth. The side chains are connected at regular intervals by blades 31 and 32, the blades 31 being of greater width than the blades 32 and all of the blades being held against swinging movement relative to the chains on which they are mounted. These blades are so proportioned that, when the narrow blades 32 are hanging downwardly and traveling above the inclined portion of apron 27, they will permit the escape thereunder of all fruit smaller than a predetermined size, this escaping fruit being caught and retained by the larger blade 31 following. The blades 31 and 32 are alternately disposed and each blade 32 is preferably provided with a flexible apron or drag 33 along its free longitudinal edge, for the purpose hereinafter set forth.

Chains 30 are mounted on sprockets 34 and 35, the sprockets 34 being secured to a shaft 36 journaled in blocks 16 while the sprockets 35 are secured to a shaft 37 journaled in blocks 8. Idler sprockets 38 are carried by the arms 28 and engage the lower flights of the chains 30 close to the lower ends of the guides 29.

Secured to one end of each blade 31 and to the opposite end of each blade 32 is a push rod 39, said rod being pivotally connected to the blade as shown at 40 and being mounted to swing upwardly and downwardly within a guide bracket 41 secured to the blade. These push rods extends beyond the adjacent ends of the blades, those on one set of blades projecting toward the right of the machine while those on the other set of blades project toward the left of the machine. Inclined guideways 42 are secured to the sides of the machine with their lower ends in the paths of the free ends of rods 39 when said rods are in their normal positions and these guideways extend upwardly past slidable blocks 43 mounted in any suitable manner upon the side beams 3. Each guideway 42 extends diagonally across one corner portion of the adjacent block so that, when the block 43 is in its normal position and a push rod 39 is traveling upwardly within the guideway, said push rod will be directed against the corner portion of block 43 and will shift the block out of its normal position, the push rod in the meanwhile being gradually elevated by the guideway 42 until it passes entirely out of engagement with the block 43 in the path thereof. The ends of the guideways 42 are open so that each push rod can readily enter the guideway and also leave it.

Obviously one slidable block 43 is located at each side of the machine. Each of these slidable blocks 43 is connected, by a link 44, to a bell crank lever 45 fulcrumed on a bracket 46 outstanding from the adjacent side beam 3. A longitudinal partition 47 is suspended above the table 22 and has a sweep 48 hingedly connected thereto and adapted to swing horizontally from one side to the other of the table. This sweep is connected to the upper edge portion of the partition 47 and is spaced from the table a space greater than the width of a deflecting member 49 located thereunder. This deflecting member is hingedly connected to partition 47 at a point nearer the tank 1 than the hinge 50 of sweep 48. The deflecting member is preferably made up of a long section 51 to one end of which is connected a shorter section 52, this shorter section, in turn, being hingedly connected to a terminal section 53. The three sections 51, 52 and 53 form a flexible deflector, the outer or free end of the section 53 being pivotally connected to the end of the sweep 48. Thus it will be seen that when the sweep is swung from one side to the other, the deflector 49 will be carried therewith and, upon reaching either limit of its movement, this deflector will bow outwardly, as shown in Fig. 2, so as to present a substantially rounded surface to the fruit brought against the deflector.

Links 54 connect the bell crank levers 45 to the sweep 48 and it will be apparent that when one of the blocks 43 is pushed longitudinally it will actuate its bell crank lever 45 so as to pull through link 54 upon the sweep and thus shift the deflector 49 toward one side of the table, the other block 43 in the meanwhile being reset in view of the pulling action on its bell crank lever by the other link 54.

In order that fruit may be further protected from injury by the deflector 49, this deflector can be provided with a protecting covering 55 of canvas or any other suitable material and which is adapted to drag along the surface of the conveyer apron 27 during the swinging movement of the deflector.

Journaled upon the top beams 5 is a shaft 56 having an intermediate crank 57. This shaft receives motion through a chain 58, from a sprocket 59 secured to shaft 36. This chain also engages a sprocket 60 secured to the shaft 56. An idler sprocket 61 engages one flight of the chain and is connected to an arm 62 adapted to swing downwardly, a spring 63 being provided for forcing sprocket 61 yieldingly against chain 58, thus holding the chain taut under all conditions.

The crank 57 works within a slot 64 formed longitudinally in one end portion of a lever 65. This lever is fulcrumed on shaft 13 and that end thereof remote from slot 64 is connected adjustably to a pitman 66.

This pitman is forked and is pivotally connected to crank arms 67 extending from the ends of a shaft 68. Said shaft extends across the inlet end of the machine at a point below and beyond the bearing blocks 8. Curved arms 69 extend upwardly from the end portions of the shaft 68 and are connected by a screen 70, as will be seen by referring to Figs. 2 and 6. The arms 69 are normally extended upwardly and outwardly away from the adjacent standards 4 and the free ends of the arms as well as the free upper edge of the screen 70 are normally at or above the level of the water contained in the tank 1. The parts are so proportioned that, during the rotation of the crank 57, the arms 69 and screen 70 will be swung downwardly and upwardly, the screen operating to work down over any fruit which may be floating close thereto and to depress the fruit within the water and discharge it under shaft 68 and into the machine. Thus the fruit can be fed intermittently to the machine.

A retaining element is mounted in the machine close to the point where the fruit is received. Several forms of these retaining elements may be used. For example, as shown in Fig. 1, a fabric strip 71 can be connected to the standards 4 below and close to the point where the fruit is supplied to the machine. This fabric strip is provided with buoyant members indicated generally at 72 which can be strips of wood, sealed tubes or the like. These buoyant members tend to hold the flexible strip 71 pressed into the paths of the free longitudinal edges of blades 31 and 32 so that fruit, after once passing into position between the blades cannot work outwardly past said blades. In other words the blades 31 and 32 as they move upwardly toward the apron 27 will successively drag over the retaining strip 71 so that all fruit held between the blades will be efficiently trapped.

In using the mechanism herein described, the parts are set in motion in any suitable manner and the lemons or other fruit to be acted on are placed in the washing tank 1 and will float therein. The fruit can be directed in any suitable manner toward the machine so that, when the feeding member 69—70 operates, it will engage predetermined quantities of the fruit and gather them downwardly and inwardly so that they will be brought to position above the retaining member 71. The mechanism provided for actuating the feeding member is such that said member will be maintained at rest while in raised position and also while in lowered position and while the member is in its lowered position, thus retaining the fruit above the strip 71, two of the blades 31 and 32 will be brought to position above the retaining strip 71. The short blade 32 will first gather all of the fruit and drag it along the strip 71 and then off of the strip onto the inclined portion of apron 27. As the short blade 32 passes off of the strip, the smaller fruit will escape between the lower longitudinal edge of blade 32 and the surface of apron 27 and will travel slowly back, this backward movement being retarded by the drag or apron 33. The next or wider blade 31 will engage the fruit which has escaped from under the blade 32. As the blades, with the fruit in the paths thereof are moved upwardly above and with the apron 27, the push rod 39 on the blade 32 comes against the block 43 in the path thereof, thus shifting the block longitudinally in the manner hereinbefore set forth and causing the block to actuate its bell crank 45 and thus shift sweep 48. The deflecting member 51 will thus be swung laterally so that, when the fruits in front of the blade 32 are discharged onto the horizontal portion of the apron 27 and between the side beams 3, they will be deflected toward one side of the partition 47 by the deflector 49. Meanwhile the push rod 39 on the next following blade 31 will engage its block 43 and push it longitudinally, thus returning the deflector 49 to its other position so that the smaller fruits which have been elevated by blade 31 will be deflected to the other side of partition 47. This operation will be repeated as the blades are brought successively to their uppermost positions, the large fruit being directed to one side of the partition 47 while the small fruit is directed to the other side of the partition. As the blades 31 and 32 arrive in position above the retaining strip 71 they are kept supplied with washed fruit by the oscillating feeding element 69—70. Thus it will be seen that the blades 31 and 32 and the parts operating the same, not only constitute means for properly sizing the fruit but also for removing the washed fruit from the tank.

Instead of utilizing the oscillating feeding member 69—70, a revoluble member such as shown in Figs. 10 and 11 can be used. This member consists of a drum 73 eccentrically mounted and adapted to be rotated by any suitable mechanism. A segmental recess 74 extends longitudinally within the drum and it will be apparent that as the drum rotates, portions of the washed fruit will be gathered within the recess 74 and carried downwardly under the shaft 75 of the drum and into the machine. Another form of feeding element has been shown in Fig. 12 wherein an imperforate gathering member 76 is eccentrically mounted, as at 77 and is interposed between end disks 78, this gathering member being provided with an active face which follows the lines of an ogee curve. The structure is such that, during the rotation of the feeding member, portions of the fruit adjacent thereto will be elevated out of the water and directed into the machine over shaft 77.

In Fig. 9 has been shown a structure which, if used, will enable both the feeding member and the flexible retaining strip 71 to be dispensed with. This device consists of a buoyant frame 79 having a bottom strip 80 of canvas or the like secured thereto and also secured at one end to the standards 4. This frame 79 is adapted to float upon the surface of the water in the tank while that portion of the canvas bottom extending beyond one end of the frame and which is secured to the standards 4 will incline downwardly and outwardly from the frame and within the water. Thus as the blades 32 and 31 are brought successively to active positions, they will engage the fruit which is in the path thereof and direct it over the frame 79, the sides of the frame being extended upwardly so that the blades, during their movement toward the apron 27, will engage the sides and thus depress the frame, thereby allowing the fruit to float over the frame. After the blades have passed the frame, it will rise in the water and thus prevent the fruit from escaping back into the tank and from position over the inclined portion of the apron 27.

In Fig. 13 has been illustrated a modified structure whereby the fruit, when elevated onto the table, can be deflected first to one side and then to the other side of the partition above the table. In this figure the partition has been indicated at 81. A deflecting blade 82 is hingedly connected to the end of the partition and extends under a transverse shaft 83 which can be rotated at any speed desired. A wabble wheel 84 rotates with this shaft and engages a fork or other projection 85 on the blade 82 so that, as the said wabble wheel 84 rotates, blade 82 will be swung from one side to the other in properly timed relation. The wabble wheel can be so shaped as to hold the blade 82 against movement for a predetermined period after it has been shifted to either of its positions.

By providing mechanism such as described, the fruit as soon as washed can be divided into two grades, all fruit of one grade being directed into one channel formed by partition 49 while the fruit of the other grade is directed into the other channel formed by said partition.

It will be seen that by rotating the shaft 13, all of the boxes 8 and 16 can be raised or lowered as desired, thus to bring the blades 31 and 32 to any desired distances from the inclined portion of the apron 27, thereby adapting the machine to size the fruit at any desired grade.

Importance is attached to the fact that the upper end portions of the guides 29 are extended downwardly toward the apron 27 above the roller 24. By arranging the guides in this manner, the blades, while in the act of discharging fruit onto the apron 27, will be brought downwardly closer to the belt 27 so that there will be no danger of any of the fruit which may have been brought to this point, rolling backward under the blades. The guides 29 will cause the blades to move sufficient distances along the upper portion of apron 27 to carry the fruit beyond the point of any possibility of rolling back onto the incline.

What is claimed is:—

1. The combination with a washing tank, of fruit sizing means for removing fruit from the tank.

2. The combination with a washing tank, of combined fruit sizing and elevating means for removing fruit from the tank, and means controlled by said sizing means for deflecting the sized fruit in different directions, according to grade.

3. The combination with a washing tank, of a combined elevating and conveying apron extending upwardly within and beyond the tank, means coöperating with the apron for sizing fruit while moving upwardly with the apron, and mechanism for feeding fruit to said sizing means.

4. The combination with a washing tank and an elevating apron inclined upwardly and outwardly therein, of means coöperating with the apron for engaging fruit and sizing it during its upward movement upon the apron, and a buoyant retainer coöperating with the sizing means.

5. The combination with a washing tank, and an inclined fruit supporting structure within the tank and extending therebeyond, of means above and movable longitudinally of said inclined supporting structure for elevating and grading fruit, and a buoyant retainer under and adapted to be contacted by said conveying and grading means.

6. The combination with a washing tank, of an inclined fruit support therein and extending therebeyond, a buoyant retainer extending over a portion of the support, an endless fruit conveying and sizing means above the retainer, said means including spaced fruit engaging blades of different widths.

7. The combination with a washing tank, of an inclined fruit support within the tank and extending therebeyond, an endless series of fruit engaging blades above and coöperating with the support and movable parallel therewith, alternate blades being of greater width than the remaining blades, means for actuating said series of blades to bring them successively to downwardly extending positions within the water contained in the tank, and for directing them upwardly along lines parallel with the support.

8. The combination with a washing tank and an inclined fruit support therein and extending therebeyond, of an endless series of fruit engaging blades above the support, alternate blades being of greater width than the remaining blades, means for actuating the series of blades to bring them successively into downwardly extending positions within the water contained in the tank and to propel said blades along lines parallel with the support to elevate fruit upon the support, and means for automatically feeding fruit into the paths of the blades.

9. The combination with a washing tank and an inclined fruit support therein and extending therebeyond, of an endless series of fruit engaging blades above the support, alternate blades being of greater width than the remaining blades, means for actuating the series of blades to bring them successively into downwardly extending positions within the water contained in the tank and to propel said blades along lines parallel with the support to elevate fruit upon the support, and a buoyant retaining element extending under and adapted to be engaged successively by the blades.

10. The combination with a washing tank and an inclined apron extending downwardly thereinto and constituting a fruit support, of an endless series of fruit engaging blades, means for actuating said blades to bring them successively into the water contained in the tank and to move the blades along a path parallel with the inclined portion of the apron, said blades and apron coöperating to engage fruit and elevate it from the water, and a buoyant retaining element extending between the apron and the blades.

11. The combination with a washing tank and an inclined apron extending downwardly thereinto and constituting a fruit support, of an endless series of fruit engaging blades, means for actuating said blades to bring them successively into the water contained in the tank and to move the blades along a path parallel with the inclined portion of the apron, said blades and apron coöperating to engage fruit and elevate it from the water, alternate blades being of greater width than the remaining blades.

12. The combination with a washing tank and an inclined apron extending downwardly thereinto and constituting a fruit support, of an endless series of fruit engaging blades, means for actuating said blades to bring them successively into the water contained in the tank and to move the blades along a path parallel with the inclined portion of the apron, said blades and apron coöperating to engage fruit and elevate it from the water, alternate blades being of greater width than the remaining blades, and a buoyant retaining means extending between the inclined portion of the apron and the blades.

13. The combination with a washing tank and an inclined apron extending downwardly thereinto and constituting a fruit support, of an endless series of fruit engaging blades, means for actuating said blades to bring them successively into the water contained in the tank and to move the blades along a path parallel with the inclined portion of the apron, said blades and apron coöperating to engage fruit and elevate it from the water, alternate blades being of greater width than the remaining blades, and means for automatically directing floating fruit into the path of the blades.

14. The combination with a washing tank and an inclined apron extending downwardly thereinto and constituting a fruit support, of an endless series of fruit engaging blades, means for actuating said blades to bring them successively into the water contained in the tank and to move the blades along a path parallel with the inclined portion of the apron, said blades and apron coöperating to engage fruit and elevate it from the water, alternate blades being of greater width than the remaining blades, means for automatically directing floating fruit into the path of the blades, and buoyant means for retaining the fruit in position between the blades.

15. The combination with a washing tank and an inclined apron extending downwardly thereinto and constituting a fruit support, of an endless series of fruit engaging blades, means for actuating said blades to bring them successively into the water contained in the tank and to move the blades along a path parallel with the inclined portion of the apron, said blades and apron coöperating to engage fruit and elevate it from the water, alternate blades being of greater width than the remaining blades, and a flexible dragging element depending from the free edge of each of the narrow blades.

16. The combination with a washing tank and a table, of an apron having an inclined portion extending into the tank and a horizontal portion extending over the table, a flexible deflector mounted to swing laterally upon the table, an endless series of fruit engaging blades upon the inclined portion of the apron, means for actuating said series of blades to swing the blades successively into the water and dispose them along lines parallel with the inclined portion of the apron and into position upon the table, alternate blades being of greater width than the remaining blades, said blades coöperating with the inclined portion of the apron to size fruit engaged thereby, and means operated by the blades for automatically shifting the deflector from one side to the other of the table.

17. The combination with a washing tank and a table, of an endless apron having an inclined portion extending into the tank and a horizontal portion extending over the table, a flexible deflector mounted to swing laterally above the table, combined fruit sizing and elevating means coöperating with the inclined portion of the conveyer and movable above the table, and mechanism operated by said sizing and elevating means for shifting the deflector from one side to the other of the table.

18. The combination with a washing tank, of an inclined fruit support extending thereinto below the water level, and an endless series of blades above said support, means for actuating said series of blades to move them downwardly successively below the level of the water and along a line parallel with said fruit support, said blades and support coöperating to size fruit engaged by the blades, and means for bodily adjusting the series of blades toward and from the fruit support.

19. The combination with a washing tank, a table, and an apron having an inclined portion extending into the tank and a horizontal portion extending over the table, of means coöperating with the apron for engaging fruit and sizing it during its upward movement upon the inclined portion of the apron, and means for guiding said fruit engaging and sizing means along and close to part of the horizontal portion of the apron.

In testimony that I claim the foregoing as my own, I have hereto affixed my signature in the presence of two witnesses.

LEE BARNETT WILLIAMS.

Witnesses:
    FLOYD P. TURNER,
    C. W. FRANKLIN.

Copies of this patent may be obtained for five cents each, by addressing the "Commissioner of Patents, Washington, D. C."